United States Patent
Wheelock et al.

(10) Patent No.: US 8,433,937 B1
(45) Date of Patent: Apr. 30, 2013

(54) AUTOMATED TRANSITIONS POWER MODES WHILE CONTINUOUSLY POWERING A POWER CONTROLLER AND POWERING DOWN A MEDIA CONTROLLER FOR AT LEAST ONE OF THE POWER MODES

(75) Inventors: David W. Wheelock, Longmont, CO (US); David J. Guss, Longmont, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 393 days.

(21) Appl. No.: 12/828,131

(22) Filed: Jun. 30, 2010

(51) Int. Cl.
*G06F 1/32* (2006.01)
*G06F 1/00* (2006.01)

(52) U.S. Cl.
USPC .............................. 713/320; 713/300; 713/324

(58) Field of Classification Search .................... 713/320
See application file for complete search history.

(56) References Cited

U.S. PATENT DOCUMENTS

| | | | |
|---|---|---|---|
| 5,345,347 A * | 9/1994 | Hopkins et al. ............... | 360/71 |
| 5,412,809 A * | 5/1995 | Tam et al. ..................... | 713/324 |
| 5,493,670 A | 2/1996 | Douglis et al. | |
| 5,682,273 A | 10/1997 | Hetzler | |
| RE36,189 E * | 4/1999 | Carter et al. .................. | 713/324 |
| 5,978,923 A * | 11/1999 | Kou ............................... | 713/323 |
| 6,553,501 B1 * | 4/2003 | Yokoe ............................ | 713/320 |
| 6,608,729 B1 | 8/2003 | Willems et al. | |
| 6,678,831 B1 | 1/2004 | Mustafa et al. | |
| 6,725,385 B1 * | 4/2004 | Chu et al. ...................... | 713/320 |
| 7,383,450 B2 | 6/2008 | Rothman et al. | |
| 7,386,661 B2 * | 6/2008 | Perozo et al. ................. | 711/112 |
| 7,412,615 B2 * | 8/2008 | Yokota et al. ................. | 713/323 |
| 7,584,375 B2 | 9/2009 | Gutman et al. | |
| 7,660,976 B2 * | 2/2010 | Kurosaki ......................... | 713/1 |
| RE43,211 E * | 2/2012 | Schlumberger .............. | 713/320 |
| 8,139,435 B2 * | 3/2012 | Yamasaki ...................... | 365/226 |
| 8,286,018 B2 * | 10/2012 | Chang et al. ................. | 713/324 |
| 2005/0138296 A1 | 6/2005 | Coulson et al. | |
| 2009/0024860 A1 | 1/2009 | Krishnamoorthy et al. | |
| 2009/0132838 A1 | 5/2009 | Cherian et al. | |
| 2009/0204835 A1 | 8/2009 | Smith et al. | |

FOREIGN PATENT DOCUMENTS

WO WO 2008/010795 A1 1/2008

* cited by examiner

*Primary Examiner* — Suresh Suryawanshi (57) ABSTRACT

A data storage device comprising a storage media, a media controller, a power system and a power controller is disclosed. The media controller is configured to read data from and write data to the storage media. The power system is configured to controllably power the media controller, and the power controller is configured to autonomously transition the data storage device between a plurality of power modes, wherein the power system continuously powers the power controller through the power modes and powers down the media controller for at least one of the power modes.

26 Claims, 6 Drawing Sheets

AUTOMATED TRANSITIONS POWER MODES WHILE CONTINUOUSLY POWERING A POWER CONTROLLER AND POWERING DOWN A MEDIA CONTROLLER FOR AT LEAST ONE OF THE POWER MODES

BACKGROUND

Data storage devices are commonly used to store data in computers, data bases, digital video recorders, and other devices. Examples of data storage devices include disk drives and solid state drives. A data storage device may write data to and read data from a storage media in response to write/read commands from a host that uses the data storage device for data storage. When the data storage device does not receive a write/read command from the host over time, the data storage device may transition to one or more low power modes to save power. It is desirable to reduce the amount of power that is consumed in the low power modes to further improve power savings.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
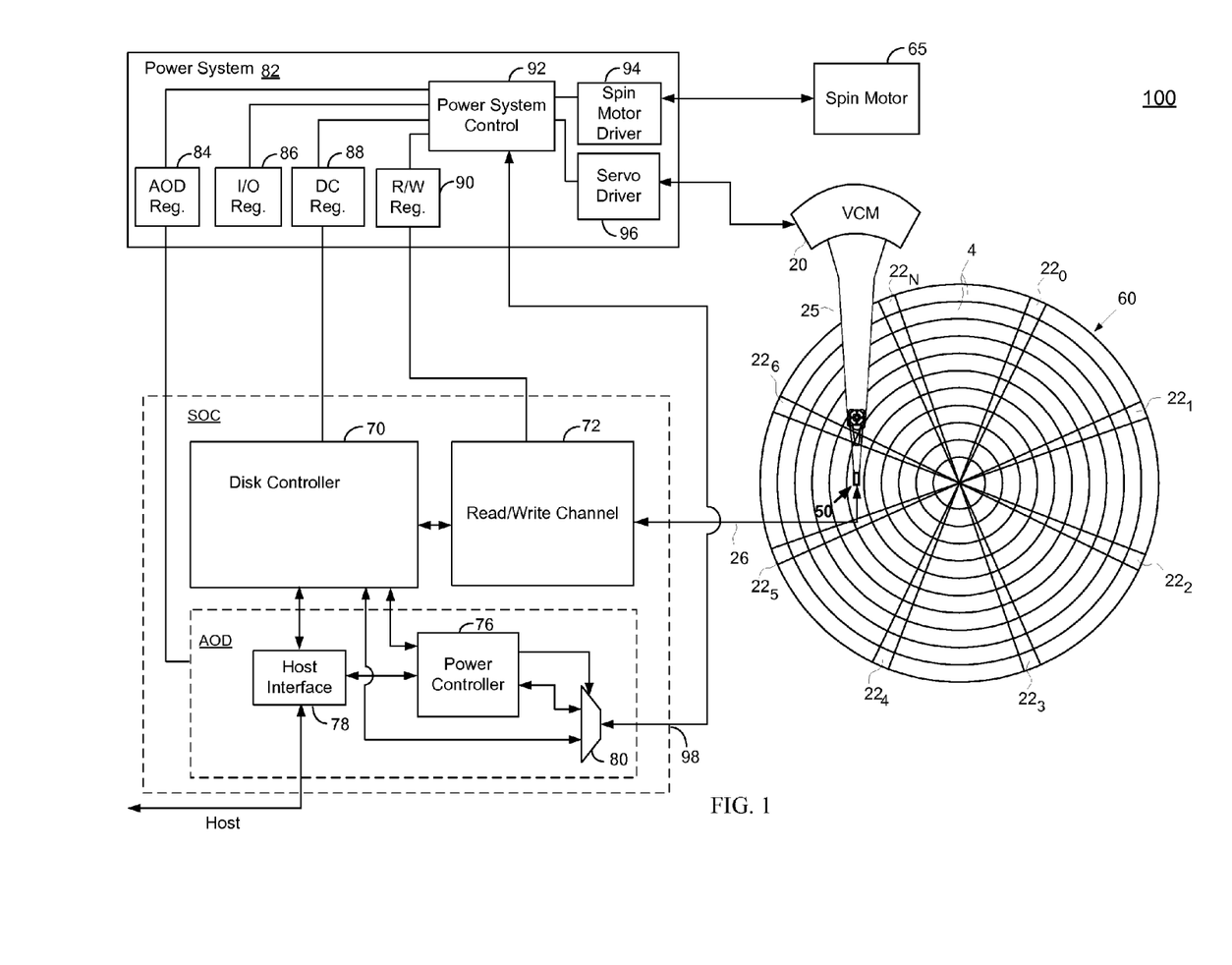
FIG. 1 is a block diagram of a disk drive according to an embodiment of the present invention.

FIG. 1 shows a disk drive 100 according to an embodiment of the present invention. The disk drive 100 comprises a rotating magnetic disk 60, an actuator arm 25, a voice coil motor (VCM) 20, a head 50 connected to the distal end of an actuator arm 25, and a spin motor 65. The actuator arm 25 is rotated about a pivot by the VCM 20 to position the head 50 radially over the disk 60. The spin motor 65 rotates the disk 60. For ease of illustration, the spin motor 65 is shown separately from the disk 60, although one skilled in the art will appreciate that the spin motor 65 is typically located at the center of the disk 60.

The disk 60 comprises a number of radially spaced, concentric tracks 4. Each track 4 may be divided into a number of data sectors (not shown) that are spaced circumferentially along the track 4. The disk 60 may also comprise a plurality of angularly spaced servo wedges $22_0$-$22_N$, each of which may include embedded servo information (e.g., servo bursts) that can be read from the disk 60 by the head 50 to determine the position of the head 50 over the disk 60, as discussed further below. User data may be stored between the servo wedges $22_0$-$22_N$ in the data sectors.

The disk drive 100 also comprises a disk controller 70, a read/write channel 72, a host interface 78, a power controller 76 and a multiplexer 80, all of which may be integrated on a system on a chip (SOC) as show in the example in FIG. 1. Alternatively, these components may be implemented on two or more chips.

The disk controller 70 may be implemented using one or more processors for executing instructions (firmware) stored in memory, such as a volatile or non-volatile memory. The instructions may be executed by the one or more processors to perform the various functions of the disk controller 70 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

The read/write channel 72 is configured to receive data to be written to the disk 60 from the disk controller 70 and process the data into a write signal 26, which is outputted to the head 50. The head 50 converts the write signal 26 into a magnetic field that magnetizes the surface of the disk 60 based on the write signal, thereby magnetically writing the data to the disk 60. The read/write channel 72 is also configured to receive a read signal 26 from the head 50 based on the magnetization of the disk surface under the head 50. The read/write channel 72 processes the read signal 26 into data, which is outputted to the disk controller 70.

The host interface 78 is configured to interface the disk drive 100 with a host (e.g., host processor) that uses the disk drive 100 for data storage. The disk controller 70 receives commands (e.g., read/write commands) and data from the host via the host interface 78. The disk controller 70 also outputs data (e.g., data requested by a host read command) and status information to the host via the host interface 78. The host interface 78 may interface with the host according to the serial advanced technology attachment (SATA) standard or other standard.

The power controller 76 is configured to transition the disk drive 100 between a plurality of different power modes. As discussed further below, the power controller 76 may autonomously transition the disk drive 100 between power modes with the disk controller 70 powered down.

The disk drive 100 also comprises a power system 82. The power system 82 may comprise a power system control 92, a spin motor driver 94 and a servo driver 96. The spin motor driver 94 is configured to drive the spin motor 65 to rotate the disk 60 at a desired rotations per minute (RPM) and the servo driver 96 is configured to drive the VCM 20 (e.g., with a current) to position the head 50 at a desired radial location over the disk 60. As discussed further below, the power system control 92 may control the spin motor driver 94 and the servo driver 96 based on commands received from the disk controller 70 and/or power controller 76.

The power system 82 may also comprise a plurality of regulators (e.g., voltage regulators) to provide power to various components of the disk drive 100. In the example shown in FIG. 1, the power system 82 comprises an always on domain (AOD) regulator 84, an input/output (I/O) regulator 86, a disk controller regulator 88, and a read/write channel regulator 90. The AOD regulator 84 provides power to components in an always on domain (AOD). In the example shown in FIG. 1, the power controller 76, the host interface 78, and the multiplexer 80 are located in the AOD, and therefore receive power from the AOD regulator 84. For purposes of this disclosure, it is to be understood that the AOD is not literally powered on all of the time. Rather, it is to be understood that the AOD is continuously powered on through a plurality of different power modes, during which time the disk controller 70, the read/write channel 72 or both may be powered down to converse power, as discussed further below. Thus, "always on" may be with respect to the plurality of power modes.

The I/O regulator 86 provides power to various inputs/outputs of the SOC to off chip devices (e.g., an external DRAM buffer, the power system 82, etc.). For ease of illustration, connections between the I/O regulator 86 and the input/outputs of the SOC are not shown in FIG. 1. The disk controller regulator 88 is configured to provide power to the disk controller 70 and the read/write channel regulator 90 is configured to provide power to the read/write channel 72.

The power system control 92 may independently control the regulators 84-90, and therefore independently control power to the AOD, the input/outputs of the SOC, the disk controller 70 and the read/write channel 72. In one embodiment, the power system control 92 may control one or more of the regulators 84-90 based on commands received from the disk controller 70 and/or the power controller 76. For example, the disk controller 70 and/or the power controller 76 may send commands to the power system control 92 through a power port 98. The power port 98 may be a serial port or other type of interface.

Commands from the disk controller 70 and the power controller 76 to the power system 82 may be routed through the multiplexer 80. In one embodiment, the multiplexer 80 may pass commands from both the disk controller 70 and the power controller 76 to the power system 82. In this embodiment, a protocol may be employed to avoid collisions between commands from the disk controller 80 and the power controller 76. In another embodiment, the multiplexer 80 may be configured to only pass commands from one of the disk controller 70 and the power controller 76 at a time. In this embodiment, the multiplexer 80 may receive a command controlling which one of the disk controller 70 and the power controller 76 currently has access to the power system 82 through the power port 98.

During normal write/read operations, the disk controller 70 may write data to and read data from the disk 60 in response to write/read commands from the host. When the disk controller 70 receives a write command via the host interface 78, the disk controller 70 may temporarily hold the corresponding data from the host in a DRAM buffer (not shown) and write the data from the buffer to the disk 60 via the read/write channel 72. The disk controller 70 may notify the host via the host interface 78 when the write command has been completed (e.g., when the data has been successfully written to the disk 60). Similarly, when the disk controller 70 receives a read command from the host via the host interface 78, the disk controller 70 may read the data requested by the read command from the disk 60 via the read/write channel 72, temporarily hold the read data in the buffer and output the read data from the buffer to the host via the host interface 78.

To write data to the disk 60, the disk controller 70 may first position the head 50 at a desired track on the disk 60. The disk controller 70 may do this by sending commands to the power system control 92 to control the drive signal (e.g., current) from the servo driver 96 to the VCM 20 such that the VCM 20 moves the actuator arm 25 to position the head 50 at the desired track. After the head 50 is positioned at the desired track, the disk controller 70 may perform track following to keep the head 50 on the desired track. The disk controller 70 may do this by reading servo information (e.g., servo bursts) from the servo wedges on the track via the read/write channel 72 and generating a position error signal (PES) based on the read servo information indicating the offset of the head 50 from the center of the desired track. The disk controller 70 may then send commands to the power system control 92 to adjust the position of the head 50 in a direction that reduces the PES, thereby keeping the head 50 on track. When the head 50 is properly positioned, the disk controller 70 may send the data to the read/write channel 72 to write the data to the disk 60 using the head 50. The disk controller 70 may repeat the above steps to write data to multiple tracks.

To read data from the disk 60, the disk controller 70 may first position the head 50 at a desired track on the disk 60 as described above. After the head 50 is positioned at the desired track, the disk controller 70 may perform track following as described above to keep the head 50 on track during the read operation. When the head 50 is properly positioned over the track, the disk controller 70 may read the data from the desired track via the read/write channel 72. The disk controller 70 may repeat the above steps to read data from multiple tracks on the disk 60.

The disk drive 100 may support a plurality of low power modes to save power based on usage of the disk drive 100 by the host. For example, the disk drive 100 may transition to a low power mode to save power when the disk drive 100 does not receive a read/write command from the host for a certain period of time. In current implementations, transitions between low power modes are under the control of the disk controller. This requires that the disk controller be fully powered on when transitioning between low power modes, which limits the amount of power that can be saved.

The power controller 76 according to embodiments of the present invention provides additional power savings by autonomously transitioning the disk drive 100 between low power modes without requiring that the disk controller 70 be fully powered on. Before discussing the power controller 76 in detail, it may be instructive to discuss several examples of low power modes, which may be used in various embodiments of the present invention.

Figure 2:
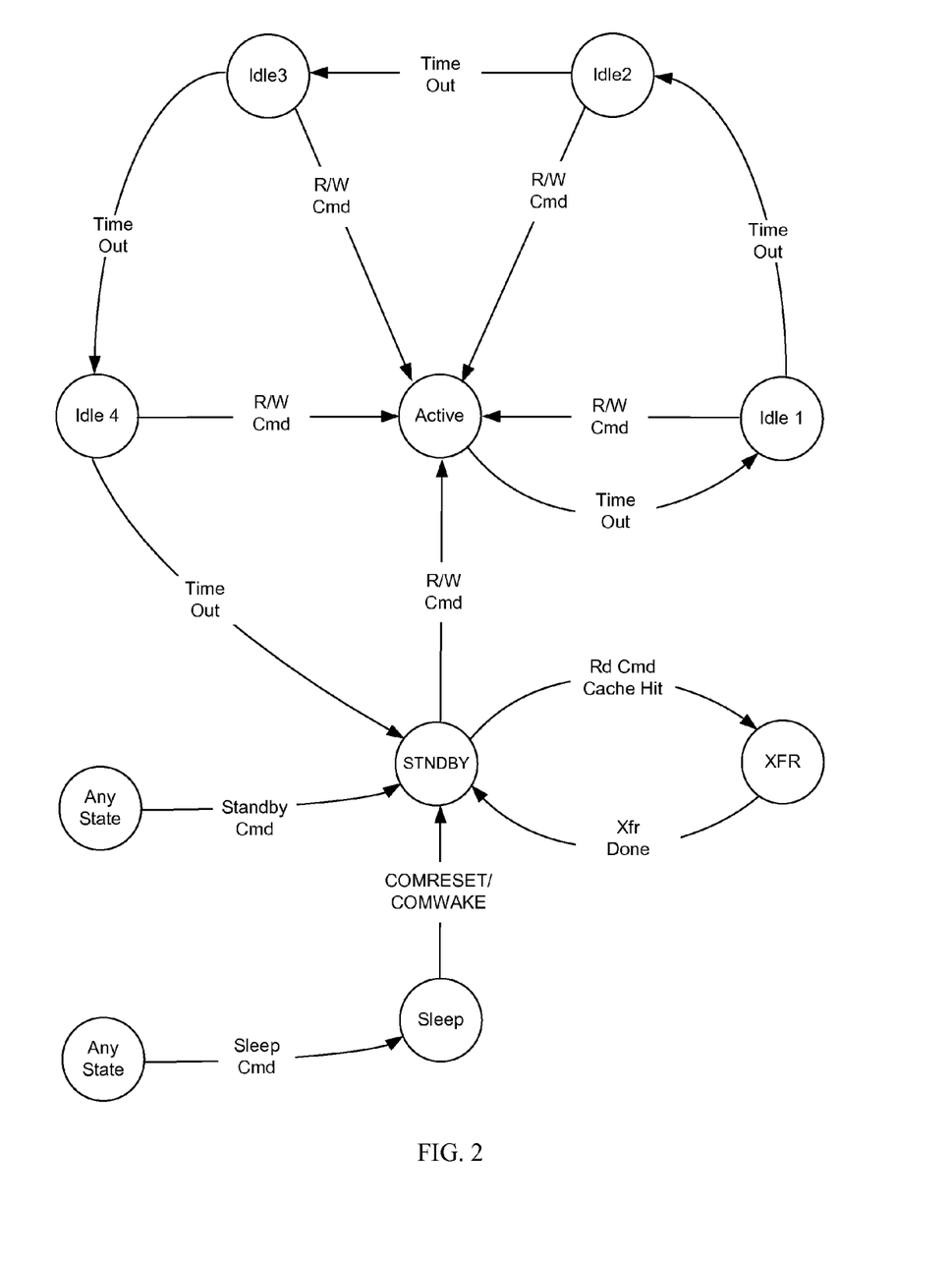
FIG. 2 is a state flow diagram showing different power modes according to an embodiment of the present invention.

FIG. 2 shows a state flow diagram illustrating the transitions between a plurality of low power modes. In the example shown in FIG. 2, the low power modes include four idle modes (idle 1 mode to idle 4 mode), a standby mode, a sleep mode and a transfer (XFR) mode.

In the idle 1 mode, the disk drive 100 is not executing host read/write commands. In this mode, the disk controller 70 and the read/write channel 72 may remain powered on to perform track following to keep the head 50 on track.

In the idle 2 mode, the head 50 floats over the disk 60 without track following. In this mode, both the disk controller 70 and the read/write channel 72 may be powered down. Alternatively, the read/write channel 72 may be powered down and the disk controller 70 may be powered on in a lower power logic retention state, as discussed further below. In this mode, the power system 82 may drive the VCM 20 with a bias current that causes the VCM 20 to apply enough force to counteract windage and/or other forces that tend to push head 50 off the disk 60. The bias current to the VCM 20 keeps the head 50 floating over the disk 60 without providing precise positioning of the head 50 over the disk 60 using track following. The idle 2 mode saves more power than the idle 1 mode by not requiring a servo control loop to perform track following.

In the idle 3 mode, the head 50 is parked off the disk 60. The idle 3 mode saves more power than the idle 2 mode by not requiring a bias current to the VCM 20 to keep the head 50 floating over the disk 60. In the idle 4 mode, the spin speed of the disk 60 is reduced, thereby reducing the power consumed by the spin motor 65. In the standby mode, the disk 60 is spun down, further reducing the power consumed by the spin motor 65.

In FIG. 2, the disk drive 100 may start in an active mode, in which both the disk controller 70 and the read/write channel 72 are fully powered on to execute read/write commands from the host. When the disk drive 100 stops receiving read/write commands from the host in the active mode, the disk drive 100 may begin transitioning through the low power modes to save power. For example, the disk drive 100 may sequentially transition through the low power modes in FIG. 2 in the order of idle 1 mode, idle 2 mode, idle 3 mode, idle 4 mode and the standby mode. The disk drive 100 may stay in each of the low power modes for a certain period of time, and transition to the next low power mode in the sequence when the disk drive 100 does not receive a read/write command from the host within the period of time (time out), as shown in FIG. 2.

In each of the above low power modes, the host interface 78 may remain powered on to detect read/write commands from the host and/or other host activity requiring involvement of the disk controller 70. When a read/write command is detected in any one of the above low power modes, the disk drive 100 may transition from the low power mode to the active mode to execute the read/write command, as shown in FIG. 2.

In the sleep mode, the host interface 78 may be in a partial or slumber mode to conserve power. In this mode, the host may send a comreset and/or comwake signal to the host interface 78 to wakeup the host interface 78 from the sleep mode to the standby mode.

When the disk drive 100 is in the standby mode and receives a host read command, the disk drive 100 may determine whether the requested data is located in the DRAM buffer. If the requested data is in the DRAM buffer (cache hit), then the disk drive retrieves the requested data from the DRAM buffer and sends the read data to the host in the XFR mode. In the XFR mode, the disk controller 70 may be powered on to execute the read command from the DRAM buffer while the read/write channel 72 may be powered down since the disk controller 70 does not need to read the requested data from the disk 60. After the requested data is sent to the host, the disk drive may return to the standby mode.

The disk drive 100 may transition from any power mode to the standby mode in response to a standby command initiated by the drive or the host. Similarly, the disk drive 100 may transition from any power mode to the sleep mode in response to a sleep command initiated by the drive or the host.

Figure 3:
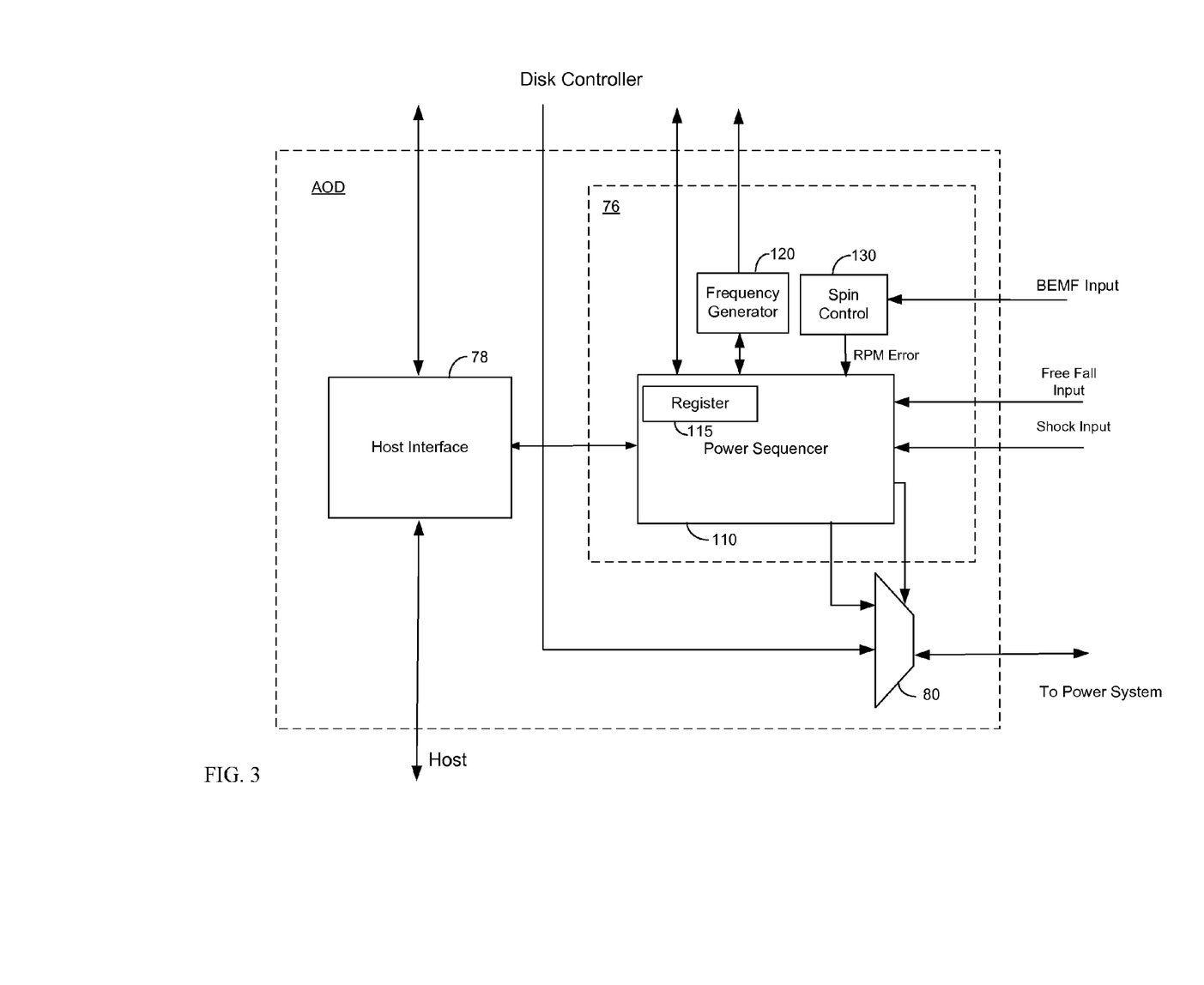
FIG. 3 is a block diagram of a power controller according to an embodiment of the present invention.

FIG. 3 shows the power controller 76 according to an embodiment of the present invention. As discussed further below, the power controller 76 may autonomously transition the disk drive 100 through low power modes (e.g., the low power modes in FIG. 2) without requiring the disk controller 70 to be fully powered on.

The power controller 76 comprises a power sequencer 110, a frequency generator 120 and a spin control 130. The power sequencer 110 is configured to transition the disk drive through a sequence of low power modes and to detect host activity using the host interface 78. In this embodiment, the power sequencer 110 may stay at each low power mode for a certain period of time and transition to the next low power mode in the sequence when the host interface 78 does not receive a host read/write command within the period of time (time out). When the host interface 78 receives a host read/write command in any one of the low power modes, the power sequencer 110 may transition the disk drive 100 to the active mode to execute the read/write command. The power sequencer 110 may also include a register 115 which can be written to and read by the disk controller 70 and the power sequencer 110, as discussed further below.

The frequency generator 120 is configured to provide one or more clock signals to the disk controller 70. The disk controller 70 may use the one or more clock signals to time various operations in the disk controller 70. The frequency generator 120 may include an oscillator (e.g., a crystal oscillator) that outputs a low frequency reference signal and one or more phase lock loops (PLLs) configured to generate the one or more clock signals from the low frequency reference signal.

The spin control 130 is configured to control the spin speed of the spin motor 65, and thus the disk 60. In one embodiment, the spin control 130 receives a back electromotive force (BEMF) signal from the spin motor 65 indicating the spin speed of the spin motor 65. The spin control 130 generates an RPM error signal indicating the difference between the spin speed derived from the BEMF and a desired spin speed, and outputs the RPM error signal to the power sequencer 110. The power sequencer 110 outputs commands to the power system 82 to adjust the drive signal from the spin motor driver 94 to the spin motor 65 in a direction that reduces the RPM error. Thus, the spin control 130 and the power sequencer 110 provide a control loop for maintaining the spin motor 65 at a desired spin speed. As discussed further below, the spin control 130 may also be configured to controllably reduce the spin speed of the spin motor 65.

Operations of the power controller 76 according to various embodiments of the present invention will now be discussed with reference to FIGS. 2 and 3. In one embodiment, the disk controller 70 may direct the transition from the active mode to the idle 1 mode. After a time out while in the idle 1 mode, the disk controller 70 may hand control of the power mode transitions to the power controller 110. For example, the disk controller 70 may program a bit in the register 115 to initiate autonomous power mode transitions by the power sequencer 110. For the embodiment in which the multiplexer 80 only passes commands from the disk controller 70 and the power controller 76 one at a time, the disk controller 70 may program a bit in the register 115 commanding the multiplexer 80 to give access of the power port 98 to the power controller 76.

When the disk controller 70 determines that its is ready to hand control to the power controller 76, the disk controller 70 may set up the disk drive 100 so that subsequent low power mode transitions can be performed autonomously by the power sequencer 110 without further involvement of the disk controller 70. For example, the disk controller 70 may store the current logic state of the disk controller 70 in the DRAM buffer (not shown). The logic state may include bits in the internal memory (e.g., registers) of the disk controller 70. As discussed further below, storing the current logic state of the disk controller 70 in the DRAM buffer allows the disk controller 70 to power down and later resume where it left off upon the next power up by reloading the logic state from the DRAM buffer.

After the disk controller 70 has set up the disk drive, the power sequencer 110 may autonomously transition the disk drive through a sequence of low power modes. In one embodiment, the power sequencer 110 may transition the disk drive to the idle 2 mode by powering down the disk controller 70 and the read/write channel 72. The power sequencer 110 may do this by commanding the power system control 92 to turn off the disk controller regulator 88 and the read/write channel regulator 90 shown in FIG. 1. The power sequencer 110 may also program the bias current for the VCM 20 into the power system 82 to keep the head 50 floating over the disk 60 in the idle 2 mode, as discussed above. Alternatively, the disk controller 70 may program the bias current before handing control to the power sequencer 110.

Instead of powering down the disk controller 70, the power sequencer 110 may reduce the power to the disk controller 70 to place the disk controller 70 in a lower power logic retention state. The power sequencer 110 may do this by commanding the power system control 92 to reduce the voltage outputted by the disk controller regulator 88 to a lower voltage. The lower voltage may be at least five percent, ten percent or twenty percent lower than the normal voltage outputted by the disk controller regulator 88 to the disk controller 70. The lower voltage may be sufficient for the disk controller 70 to retain its logic state (e.g., the bits in the internal memory of the disk controller 70) while being too low for the disk controller 70 to perform normal processing operations. An advantage of the logic retention state is that it reduces power consumption by lowering the voltage to the disk controller 70 while allowing faster recovery time when the disk controller 70 is fully powered back on because the disk controller 70 does not need to reload its logic state from the DRAM buffer.

The power sequencer 110 may track the amount of time the disk drive 100 is in the idle 2 mode, e.g., using an internal timer. When the disk drive 70 is in the idle 2 mode for a certain period of time with no host activity detected by the host interface 78 (time out), the power sequencer 110 may transition the disk drive 100 to the idle 3 mode.

The power sequencer 110 may transition the disk drive 100 to the idle 3 mode by commanding the power system control 92 to park the head 50. For the embodiment in which the disk controller 70 is in the logic retention state in the idle 2 mode, the power sequencer 110 may command the power system control 92 to power down the disk controller 70 by turning off the disk controller regulator 88. Alternatively, the power sequencer 110 may leave the disk controller 70 in the logic retention state.

The power sequencer 110 may track the amount of time the disk drive 100 is in the idle 3 mode. When the disk drive 70 is in the idle 3 mode for a certain period of time with no host activity detected by the host interface 78 (time out), the power sequencer 110 may transition the disk drive 100 to the idle 4 mode.

Figure 4:
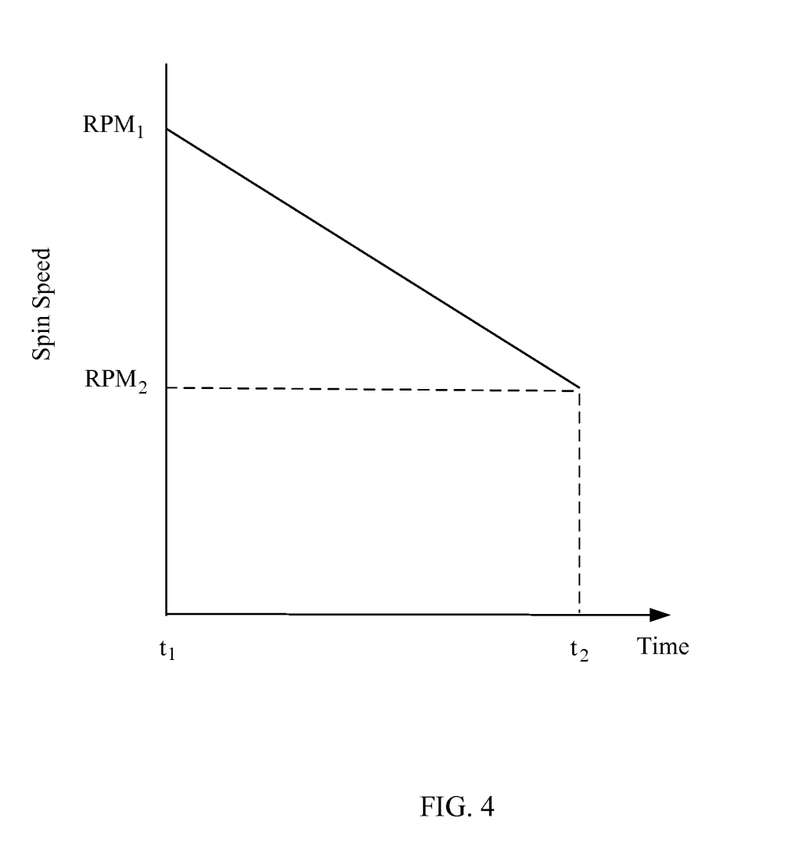
FIG. 4 shows an example of a ramp down profile according to an embodiment of the present invention.

The power sequencer 110 may transition the disk drive 100 to the idle 4 mode by reducing the spin speed of the spin motor 65 to conserve power. In this embodiment, the power sequencer 110 may reduce the spin speed of the spin motor 65 from the RPM in the idle 3 mode to a lower RPM in the idle 4 mode based on a ramp down profile that achieves desired acoustic characteristics. For example, the power sequencer 110 may ramp down the spin speed of the spin motor 65 in a way that minimizes the generation of audible noises (e.g., chirp or flutter) that can be heard by the user. FIG. 4 shows a simple example of a ramp down profile in which the spin speed is reduced linearly over time from $RPM_1$ at time $t_1$ to $RPM_2$ at time $t_2$. A ramp down profile that minimizes the generation of certain audible noises (e.g., chirp or flutter) may be determined empirically.

In this embodiment, the power sequencer 110 may send commands to the power system control 92 to reduce the drive signal from the spin motor driver 94 to the spin motor 65 according to the desired ramp down profile. As the spin speed is reduced, the spin control 130 may provide the power sequencer 110 with real-time feedback of the actual spin speed based on the BEMF so that the power sequencer 110 can adjust the drive signal to the spin motor 65 accordingly to achieve the desired ramp down profile.

The power sequencer 110 may track the amount of time the disk drive 100 is in the idle 4 mode. When the disk drive 70 is in the idle 4 mode for a certain period of time with no host activity detected by the host interface 78 (time out), the power sequencer 110 may transition the disk drive 100 to the standby mode.

The power sequencer 110 may transition the disk drive 100 to the standby mode by powering down the spin motor 65. In one embodiment, the power sequencer 110 may command the power system control 92 to ramp down the spin speed of the spin motor 62 in a way that minimizes audible noises that can be heard by the user. In another embodiment, the power sequencer 110 may command the power system control 92 to perform a hard break of the spin motor 65 to quickly stop the disk 60 from spinning. In the standby mode, the host interface 78 remains active to monitor for host activity (e.g., host read/write commands) that requires involvement of the disk controller 70.

The power sequencer 110 may transition the disk drive from the idle 2 mode to any of the other low power modes. For example, the power sequencer 110 may transition the disk drive from the idle 2 mode directly to the idle 4 mode or the standby mode to more rapidly reduce power for systems with aggressive power control requirements. It is to be appreciated that the transitions shown in FIG. 2 are exemplary only and that the power sequencer 100 may perform other transitions (e.g., idle 3 mode directly to standby mode).

In one embodiment, the AOD regulator 84 continuously provides power to the AOD through the low power modes discussed above. Providing a separate regulator 84 for the AOD allows the power controller 76 to remain powered on to perform the power mode transitions while the disk controller 70 and/or the read/write channel 72 may be powered down to conserve power.

In one embodiment, the power sequencer 110 may be configured to transition the disk drive 100 from any one of the low power modes to the active mode when the host interface 78 detects a host read/write command or other host activity requiring involvement of the disk controller 70. The power sequencer 110 may also be configured to transition the disk drive 100 to the active mode when the power sequencer 110 receives an interrupt signal from a free fall sensor, a shock sensor and/or other disturbance sensor. In this case, the power sequencer 100 may forward the interrupt signal to the disk controller 70 after the disk controller 70 is fully powered on so that the disk controller 70 can process the interrupt signal and respond appropriately. For the example of an interrupt signal from a free fall or shock sensor, the disk controller 70 may respond by moving the head 50 away from the disk 60 and/or increasing the height of the head 50 above the disk 60 to prevent damage to the disk 60.

If the disk controller 70 is in a logic retention state in a low power mode, then the power sequencer 110 may transition the disk drive 100 to the active mode by commanding the power system control 92 to fully power on the disk controller 70. For example, the power sequencer 110 may command the power system control 92 to increase the voltage outputted by the disk controller regulator 88 from the lower voltage used for the logic retention state to the normal operating voltage of the disk controller 70. After being fully powered on, the disk controller 70 may execute the received host read/write command or process the interrupt signal.

Figure 5:
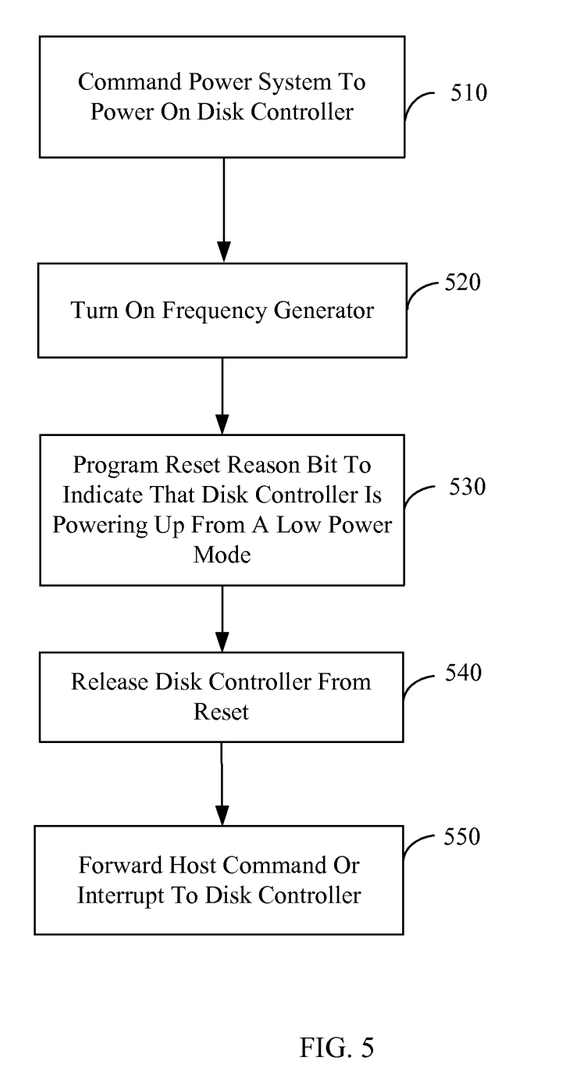
FIG. 5 is a flow diagram illustrating a power up procedure for a disk controller according to an embodiment of the present invention.

If the disk controller 70 is powered down in a low power mode, then the power sequencer 110 may transition the disk drive 100 to the active mode by powering up the disk controller 70 according to the procedure in FIG. 5.

In step 510, the power sequencer 110 commands the power system control 92 to turn on the disk controller regulator 88 to restore power to the disk controller 70. In this embodiment, the disk controller 70 may not start running until the disk controller 70 is released from reset.

In step 520, the power sequencer 110 may turn on the frequency generator 120 to generate one or more clock signals for the disk controller 70. The frequency generator 120 may be turned off while the disk controller 70 is powered down and/or in the logic retention state to conserve power. In one embodiment, the power sequencer 110 may turn on the frequency generator 120 before the disk controller 70 has started running (e.g., the disk controller 70 has been released from reset). This reduces the amount of time for the disk controller 70 to begin executing host read/write commands by not requiring the disk controller 70 to separately turn on the frequency generator after the disk controller 70 has started running.

In step 530, the power sequencer 110 may program a reset reason bit in the register 115 to indicate to the disk controller 70 that the disk controller 70 is powering up from a low power mode and not a power on reset. When the disk controller 70 starts running after being released from reset, the disk controller 70 may read the reset reason bit in the register 115 to determining whether the disk controller 70 is being powered up from a low power mode. If the reset reason bit indicates that the disk controller is being powered up from a low mode, then the disk controller 70 may retrieve its previous logic state from the DRAM buffer and reload the previous logic state in the disk controller 70.

In step 540, the power sequencer 110 releases the disk controller 70 from reset. For example, the power sequencer 110 may release the disk controller 70 from reset after the voltage to the disk controller 70 has stabilized, the frequency generator 120 has been turned on and/or the reset reasons bit has been programmed. After being released from reset, the disk controller 70 starts running and reads the reset reasons bit to determine whether the disk controller 70 is being powered up from a low power mode or power on reset.

In step 550, the received host/write command or the interrupt signal is forwarded to the disk controller 70 by the host interface and/or power sequencer 110. For the example of a host read/write command, the disk controller 70 executes the host read/write command as described above. For the example of an interrupt signal from a disturbance sensor, the disk controller 70 processes the interrupt signal and responds appropriately to the detected disturbance (e.g., shock).

For the embodiment in which the multiplexer 80 only passes commands from the disk controller 70 and the power controller 76 one at a time, the power sequencer 110 may command the multiplexer 80 to give access of the power port 98 back to the disk controller 70. Alternatively, the disk controller 70 may take back control of the power port 98 after fully powering on from a low power mode. The disk controller 70 may do this by programming a bit in the register 115 commanding the multiplexer 80 to give control of the power port 98 to the disk controller 70.

Embodiments of the present invention are not limited to disk drives and may be used in other types of data storage devices (e.g., solid state drives) to provide power mode transitions.

Figure 6:
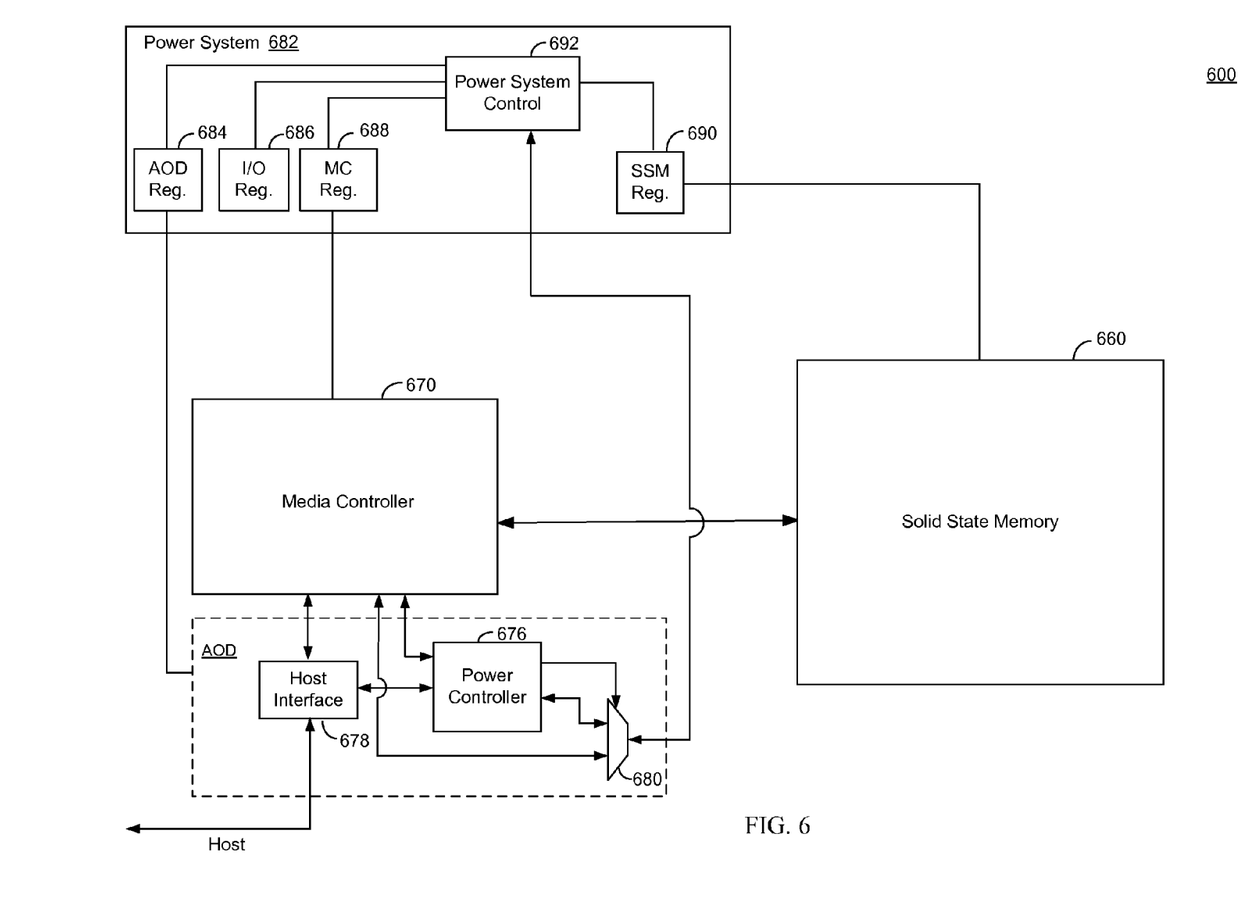
FIG. 6 is a block diagram of a solid state drive according to an embodiment of the present invention.

FIG. 6 shows a solid state drive 600 according to an embodiment of the present invention. The solid state drive 600 includes a host interface 678, a media controller 670, a power controller 676 and a multiplexer 680. The solid state drive 600 also comprises a solid state memory 660. The solid state memory 660 may comprise an array of memory cells (e.g., NAND memory cells) for storing data. The solid state memory 660 may also include circuitry for writing data to and reading data from the memory cells, and for erasing the memory cells under the direction of the media controller 670. The solid state memory 660 may write one or more bits to a memory cell by charging and/or de-charging the memory cell.

The solid state drive 600 also comprises a power system 682. The power system 682 includes an AOD regulator 684, an I/O regulator 686, a media controller regulator 688, and a solid state memory regulator 690. Similar to the power system in FIG. 1, the regulators 684-690 may be independently controlled by a power system control 692 to independently control power to various components of the solid state drive 600.

The host interface 678 is configured to interface the solid state drive 600 with a host that uses the solid state drive 600 for data storage. The host interface 678 may interface with the host according to the SATA standard (similar to a disk drive) or other standard. The media controller 670 is configured to write data to and read data from the solid state memory 660 in response to read/write commands received from the host via the host interface 678. The media controller 670 may use a buffer (e.g., DRAM buffer) to temporarily store data to be written to the solid state memory 660 and data read from the solid state memory 660. The power controller 678 is configured to autonomously transition the solid state drive 600 between a plurality of different power modes, during which time the media controller 670 and/or solid state memory 660 may be powered down.

The host interface 678, power controller 676 and multiplexer 680 may be located in an always on domain (AOD), which receives power from the AOD regulator 684. The AOD is not literally powered on all the time, but is rather continuously powered on through a plurality of low power modes, during which time the media controller 670 and/or solid state drive 600 may be powered down to conserve power.

The I/O regulator 686 is configured to power various inputs/outputs (not shown) in the solid state drive 600. The media controller regulator 688 is configured to provide power to the media controller 670 and the solid state memory regulator 690 is configured to supply power to the solid state memory 660. Although one solid state memory regulator 690 is shown in the example in FIG. 6, the power system 682 may include two or more solid state memory regulators to independently control power to different components of the solid state memory 660. Commands from the media controller 670 and the power controller 676 to the power system 682 may be routed through the multiplexer 680, similar as before.

During operation, the media controller 670 may determine that the solid state drive should transition to a low power mode to conserve power (e.g., after a period of host inactivity). In one embodiment, the media controller 670 may store its current logic state in the buffer (e.g., DRAM buffer) and initiate autonomous low power state transitions by the power controller 676, similar as before.

The power controller 676 may then autonomously transition the solid state drive through a sequence of low power modes. For each low power mode, the power controller 676 may monitor for host activity using the host interface 678. If the power controller 676 does not detect host activity (e.g., host read/write command) for a period of time, then the power controller 676 may transition the solid state drive 600 to the next low power mode in the sequence.

The lower power modes may be defined by a standard and may have different attributes from the low power modes in a disk drive due to the lack of a spinning media. In one of the low power modes, the power controller 676 may command the power system control 692 to reduce the voltage of the media controller 690 to place the media controller 670 in a lower power logic retention state. In another low power mode, the power controller 676 may command the power system control to turn off the media controller regulator 688 to power down the media controller 670. In one of the power modes, the power controller 676 may command the power system control 692 to turn off the solid state memory regulator 690 to power down the solid state memory. For the embodiment in which the power system 682 comprises two or more solid state memory regulators, the power controller 680 may command the power control system 692 to turn off a selected one of the solid state memory regulators to selectively power down components in the solid state memory 660. In one embodiment, the solid state memory 660 may support two or more power modes. In this embodiment, the power controller 676 may send a command to the solid state memory to change power modes.

When the power controller 676 detects host activity in any one of the low power modes, the power controller 676 may transition the solid state drive 600 from the low power mode to the active mode. For the example of a host read/write command, the power controller 767 may transition the solid state drive 600 to the active mode so that the media controller 670 can execute the host read/write command. The power controller 676 may also transition the solid state drive 600 to the active mode when the power controller 676 receives an interrupt signal requiring involvement of the media controller 670. In this example, the power controller 676 may forward the interrupt signal to the media controller 670 after the media controller 670 is powered on so that the media controller 670 can process the interrupt signal and respond appropriately.

If the media controller 670 is in the logic retention state, then the power controller 676 may transition the solid state drive 600 to the active mode by commanding the power system control 692 to increase the voltage of the media controller regulator 688 to the normal operating voltage of the media controller 670. If the media controller 670 is powered down, then the power controller 676 may transition the solid state drive 600 to the active mode by commanding the power system control 692 to turn on the media controller regulator 688. The power controller 676 may powered up the media controller 670 similar to the power up procedure shown in FIG. 5. For example, the power controller 676 may program a reset reason bit instructing the media controller 670 to retrieve its previous logic state from the buffer. The power controller 676 may also turn on a frequency generator to generate one or more clock signals for the media controller 670 (e.g., before the media controller 670 is release from reset). As discussed above, this allows the media controller 670 to execute host read/write commands sooner because the media controller 670 does not have to separately turn on the frequency generator after the media controller 670 starts running. The power controller 676 may also release the media controller 676 from reset to start the media controller 676 running.

For the purposes of the present specification, it should be appreciated that the terms "processor", "microprocessor", "control" and "controller", etc., refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, state machine, signal processors and microcontrollers, etc.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A data storage device configured to couple to a host, the data storage device comprising:
   a storage media;
   a media controller configured to read data from and write data to the storage media responsive to commands received from the host;
   a power system configured to controllably power the media controller; and
   a power controller configured to autonomously transition the data storage device between a plurality of power modes, wherein the power system continuously powers the power controller through the power modes and powers down the media controller for at least one of the power modes.

2. The data storage device of claim 1, wherein the power modes includes a first power mode in which the power system outputs a first voltage to the media controller that is sufficient for the media controller to perform processing functions, and a second power mode in which the power system outputs a second voltage to the media controller that is sufficient for the media controller to hold a logic state, the second voltage being lower than the first voltage.

3. The data storage device of claim 2, wherein the second voltage is at least five percent lower than the first voltage.

4. The data storage device of claim 2, wherein the power controller is configured to transition the data storage device from the first power mode to the second power mode by sending a command to the power system to lower a voltage to the media, controller from the first voltage to the second voltage.

5. The data storage device of claim 4, wherein a read/write channel is powered down in the second power mode.

6. The data storage device of claim 1, wherein the power controller is configured to transition the data storage device from one of the power modes in which the media controller is powered on to another one of the power modes in which the media controller is powered down by sending a command to the power system to power down the media controller.

7. The data storage device of claim 6, wherein, prior to powering down, the media controller is configured to save a current logic state of the media controller in a memory.

8. The data storage device of claim 1, wherein the media controller is configured to detect when the media controller is ready for the low power modes, and upon detecting that the media controller is ready, to instruct the power controller to begin autonomously transitioning the data storage device between the low power modes and to store a current logic state of the media controller in a memory.

9. The data storage device of claim 1, wherein the power controller is configured to transition the data storage device from one of the power modes in which the media controller is powered down to an active mode in which the media controller is powered on by sending a command to the power system to power on the media controller.

10. The data storage device of claim 9, wherein the power controller is configured to instruct the media controller to retrieve a previous logic state of the media controller stored in a memory and to load the previous logic state into the media controller.

11. The data storage device of claim 9, wherein the power controller is configured to transition the data storage device to the active mode in response to detecting activity from a host device.

12. The data storage device of claim 9, wherein the power controller is configured to transition the data storage device to the active mode in response to receiving an interrupt signal from a disturbance sensor.

13. The data storage device of claim 12, wherein the power controller is configured to forward the interrupt signal to the media controller after the media controller is powered on.

14. The data storage device of claim 1, wherein the power controller is configured to transition the data storage device from one of the power modes to another one of the power modes when the power controller detects no activity from a host device for a period of time.

15. The data storage device of claim 1, wherein the storage media comprises solid state memory.

16. The method of claim 1, wherein the storage media comprises a disk.

17. The data storage device of claim 16, wherein the power controller is configured to control a spin speed of the disk when the media controller is powered down.

18. The data storage device of claim 17, wherein the power controller is configured to reduce the speed of the disk when the power controller transitions the data storage device from one of the low power modes to another one of the low power modes.

19. The data storage device of claim 18, wherein the power controller is configured to reduce the spin speed of the disk according to ramp down profile that achieves desired acoustic characteristics.

20. A method performed in a data storage device, the data storage device comprising a storage media, a media controller configured to read data from and write data to the storage media, a power system and a power controller configure to transition the data storage device between two power modes, the method comprising:
  controllably powering the media controller using the power system;
  detecting no activity from a host device for a period of time; and
  in response to detecting no activity for the period of time, the power controller transitioning the data storage device between the two power modes autonomously of the media controller,
  wherein the power system continuously powers the power controller through the two power modes and powers down the media controller for at least one of the two power modes.

21. The method of claim 20, wherein, in one of the power modes, a first voltage is outputted to the media controller that is sufficient for the media controller to perform processing functions, and, in the other power mode, a second voltage is outputted to the media controller that is sufficient for the media controller to hold a logic state, the second voltage being lower than the first voltage.

22. The method of claim 21, wherein the second voltage is at least five percent lower than the first voltage.

23. The method of claim 20, wherein transitioning the data storage device comprises saving a current logic state of the media controller in a memory prior to powering down the media controller.

24. The method of claim 20, further comprising:
  detecting an access command from a host device or an interrupt signal from a disturbance sensor; and
  in response to detecting the access command or interrupt signal, the power controller transitioning the data storage device from one of the power modes to an active mode in which the media controller is powered on.

25. The method of claim 24, further comprising instructing the media controller to retrieve a previous logic state of the media controller from a memory and load the previous logic state into the media controller.

26. The method of claim 24, further comprising forwarding the interrupt signal to the media controller after the media controller is powered on.

* * * * *